(12) United States Patent
Powell et al.

(10) Patent No.: US 11,803,636 B2
(45) Date of Patent: Oct. 31, 2023

(54) SECURITY SYSTEM AND METHOD

(71) Applicant: Palantir Technologies Inc., Denver, CO (US)

(72) Inventors: Thomas Powell, London (GB); Kyle Patron, Philadelphia, PA (US); Mark Elliot, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/713,868

(22) Filed: Apr. 5, 2022

(65) Prior Publication Data

US 2022/0229900 A1 Jul. 21, 2022

Related U.S. Application Data

(63) Continuation of application No. 16/245,671, filed on Jan. 11, 2019, now Pat. No. 11,301,561.

(30) Foreign Application Priority Data

Apr. 3, 2018 (GB) ..................................... 1805429

(51) Int. Cl.
*G06F 21/53* (2013.01)
*G06F 21/56* (2013.01)
*G06F 21/60* (2013.01)
*G06F 21/62* (2013.01)

(52) U.S. Cl.
CPC ............ *G06F 21/53* (2013.01); *G06F 21/566* (2013.01); *G06F 21/604* (2013.01); *G06F 21/6281* (2013.01); *G06F 2221/2113* (2013.01); *G06F 2221/2141* (2013.01); *G06F 2221/2149* (2013.01)

(58) Field of Classification Search
CPC .. G06F 21/53; G06F 21/6218; G06F 21/6281; G06F 21/566; G06F 21/604; G06F 2221/2113; G06F 2221/2141; G06F 2221/2149; H04L 63/102; H04L 63/20
See application file for complete search history.

(56) References Cited

U.S. PATENT DOCUMENTS

| | | | |
|---|---|---|---|
| 7,200,858 B1* | 4/2007 | Benjamin | H04N 21/23439 725/132 |
| 11,301,561 B2 | 4/2022 | Powell et al. | |
| 2008/0189757 A1* | 8/2008 | Schackow | H04L 63/20 726/1 |
| 2009/0222925 A1* | 9/2009 | Hilaiel | G06F 21/53 726/25 |

(Continued)

OTHER PUBLICATIONS

U.S. Pat. No. 11,301,561, Security System and Method, Apr. 12, 2022.

*Primary Examiner* — Richard A Mccoy
(74) *Attorney, Agent, or Firm* — Knobbe, Martens, Olson & Bear, LLP

(57) ABSTRACT

A method performed by one or more processors, and an apparatus is disclosed. The method may comprise identifying a request from a custom computer program within a sandbox to perform an operation not permitted within the sandbox, and receiving a first indication of security privileges associated with a provider of the custom computer program. The method may also comprise selectively causing the operation to be performed based on the first indication of security privileges.

11 Claims, 8 Drawing Sheets

(56) References Cited

U.S. PATENT DOCUMENTS

2013/0318613 A1\* 11/2013 Archer .................. G06F 21/577
726/25
2019/0230090 A1\* 7/2019 Kathiara ............... H04L 9/3247

\* cited by examiner

SECURITY SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The subject disclosure relates to security systems and methods for protecting against malicious code.

Description of the Related Art

Computers run a wide range of computer programs which are trusted to varying degrees. Operating systems provide various security features for limiting the damage that can be caused by malicious code contained in less trusted computer programs. These security features include process isolation, user privileges, file permissions and sandboxing. Modern web browsers also provide some of these same features, e.g. sandboxing, for limiting the damage that can be caused by web applications.

Despite their numerous benefits, these security features are typically applied in a manner that is either overly restrictive or too lax. Overly restrictive security unnecessarily limits users' ability to use those computer programs, resources and features that they desire and, in some cases, need. On the other hand, too lax security unnecessarily risks confidential data being exposed and system resources being maliciously exploited. Counterintuitively, too lax security often follows as a consequence of initially overly restrictive security because users are frustrated to such an extent that they, or their system administrator, may disable many security features wholesale resulting in too lax security.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An embodiment discloses a method performed by one or more processors, the method comprising: identifying a request from a custom computer program within a sandbox to perform an operation not permitted within the sandbox; receiving a first indication of security privileges associated with a provider of the custom computer program; and selectively causing the operation to be performed based on the first indication of security privileges.

Selectively causing the operation to be performed may comprise causing the operation to be performed if the first indication indicates that the provider is permitted to perform the operation.

The method may further comprise, in response to the first indication indicating that the provider is not permitted to perform the operation, generating an alert based on the request from the custom computer program and causing the alert to be at least one of stored or transmitted.

The method may further comprise: receiving a second indication of security privileges associated with the custom computer program; wherein selectively causing the operation to be performed comprises causing the operation to be performed if the first indication indicates that the provider is permitted to perform the operation and the second indication indicates that the custom computer program is permitted to perform the operation.

The method may further comprise: in response to the second indication indicating the custom computer program is not permitted to perform the operation, generating an alert based on the request from the custom computer program and causing the alert to be at least one of stored or transmitted.

The custom computer program may comprise code executable by a web browser.

The sandbox may be provided by a web browser. The sandbox may be configured by an HTML iframe sandbox attribute. The sandbox may comprise a computer process.

The sandbox may be implemented using mandatory access control.

The operation may comprise retrieving data, and the method may further comprise: communicating a response comprising at least a portion of the retrieved data to the custom computer program.

Another embodiment may provide a computer program, optionally stored on a non-transitory computer readable medium program which, when the program is executed by a computer, cause the computer to carry out a method according to any preceding method definition.

The computer program may comprise the custom computer program. The computer program may be executable by a web browser.

Another embodiment provides an apparatus configured to carry out a method according to any preceding method definition, the apparatus comprising one or more processors or special-purpose computing hardware.

In some embodiments, selectively causing the operation to be performed may comprise not causing the operation to be performed if the first indication indicates that the provider is not permitted to perform the operation.

In some embodiments, the method may further comprise receiving a second indication of security privileges associated with the custom computer program; wherein selectively causing the operation to be performed comprises not causing the operation to be performed if the second indication indicates that the custom computer program is not permitted to perform the operation.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Figure 1:
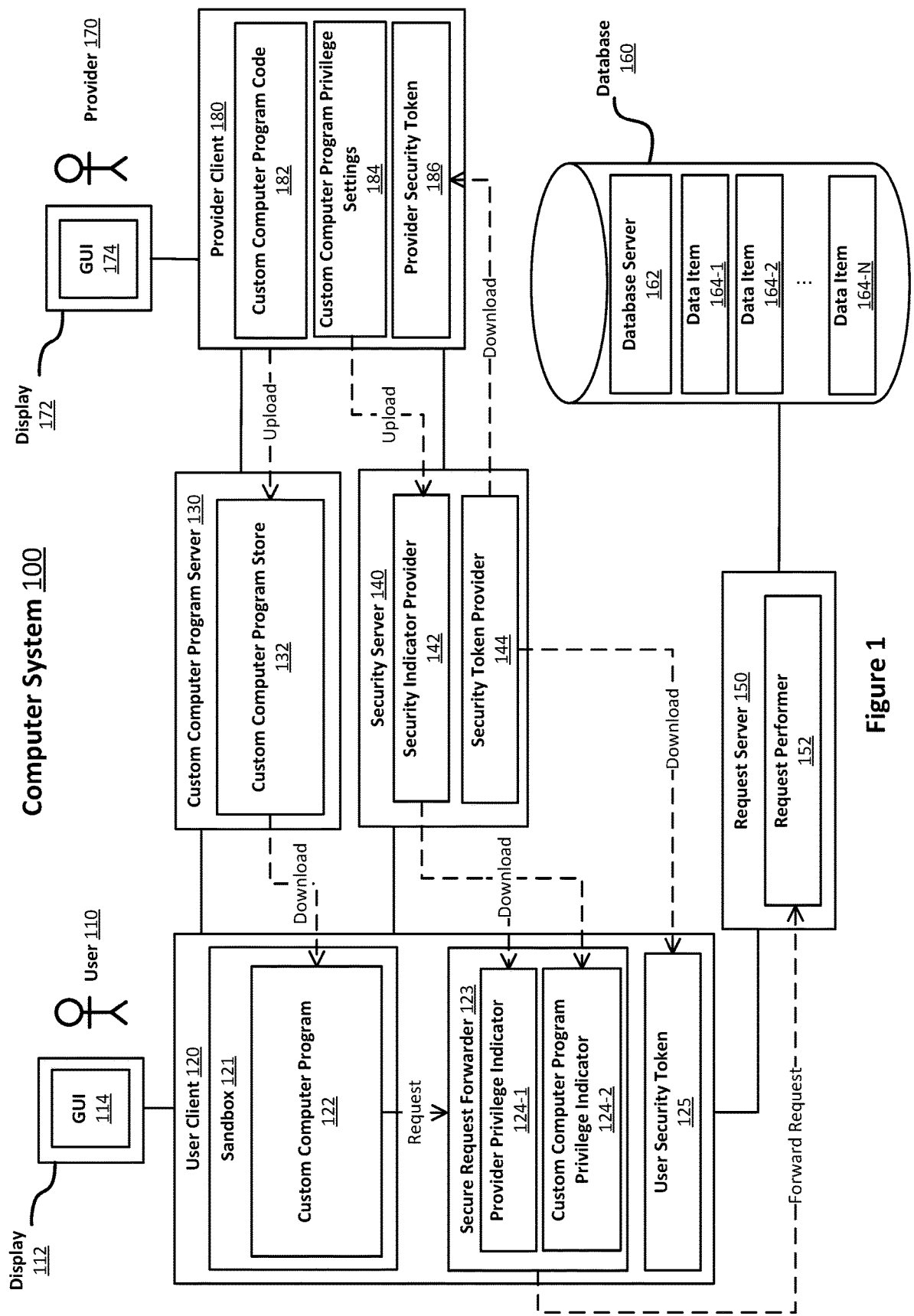
FIG. 1 is a block diagram illustrating an example of a computer system configured to secure a custom computer program, in accordance with example embodiments.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Example embodiments relate to security systems and methods for protecting against malicious code. These systems and methods limit the security privileges of custom computer programs to those of the party providing the custom computer program. "Security privileges" as used herein may include any method, system, or datum associated with the operations that a particular user of a system and/or a particular computer program is permitted to perform. "Higher security privileges" refer to a user being able to access more data and/or data with more restrictions and to perform more system critical operations and/or system critical operations with more restrictions. "Lower security privileges" refers to the converse.

The term "forward" and its derivatives as used herein expressly include any instance of receiving a data item or request and subsequently transmitting the data item or request; a portion of the data item or request; a transformation of the data item or request; or a new data item or request based on the received data item or request.

A "custom computer program" as used herein may include any computer program provided by a party that is not trusted to the same extent as a base system and/or the current user. The described embodiments relate to contexts where the custom computer program is a web application or a native application. The term is not limited to such embodiments and could be any computer program fulfilling the above definition, e.g. a script file, bytecode, a kernel module or a device driver.

Some of the following embodiments detail using a secure request forwarder to receive requests from a custom computer program and selectively forward these requests to a request performer. It should however be appreciated that the secure request forwarder is represented as a separate module merely for ease of explanation. The secure request forwarder may be any executable code configured to perform the specified operations, e.g. operating system code, multiple cooperating computer programs or a small part of an overarching security application.

Embodiments of the present disclosure may involve receiving requests to perform operations from a custom computer program and determining whether to cause them to be performed. The custom computer program may be executed within a sandbox, which is generally understood as a container limiting the operations that computer programs executed within it may perform. When the custom computer program wants to perform an operation that it cannot perform inside the sandbox, it may send a request to a computer program outside the sandbox. This computer program may determine whether the provider of the custom computer program, e.g. its developer, has sufficient privileges to perform the operation, and only causes the operation to be performed if the provider has sufficient privileges. If the provider does not have sufficient privileges, then the operation will not be performed and a security alert may be generated.

Accordingly, users with higher security privileges, e.g. an administrator, are able to run custom computer programs provided by a provider with lower security privileges, e.g. a developer, without being concerned that the provider could maliciously exploit their higher security privileges. Without the foregoing, the provider could exploit the user's security privileges by including code in the custom computer program that performs destructive operations, e.g. deleting important data, or exposes restricted data, that are permitted by virtue of the custom computer program being executed by an administrator having rights to perform the destructive operations. Embodiments therefore provide improved security.

Example Computer System

FIG. 1 illustrates an example of a computer system 100 configured to secure a custom computer program. As shown, the computer system 100 includes a user client computing device 120 used by a human user 110, a custom computer program server 130, a security server 140, a request server 150, and a database 160. A provider computer client device 180 used by a human custom computer program provider 170 is also shown. The user client computing device 120 is configured to communicate with the servers 130, 140, 150 via a network. Similarly, the provider client computing device 180 is configured to communicate with at least the custom computer program server 130 and the security server 140 via the same or another network. These networks may include the Internet, an intranet, a local area network, a wide area network, a wired network, a wireless network, a virtual private network (VPN), and/or any combination of networks. For ease of understanding, various components of the system have each been described with reference to one or more computing devices. It should be noted that, in same embodiments, any number of these components may be collocated on the same computing device.

Each of the user device 120 and provider client computing device 180 may for instance be a laptop computer, a desktop computer, a mobile phone, a personal digital assistant (PDA), a tablet computer, a netbook, a television with one or more processors, embedded therein or coupled thereto, a physical machine or a virtual machine. Each may include one or more of a keyboard, a mouse, a display 112, or a touch screen (of which display 112 may be a part of). For example, they may be composed of hardware components like those of the example computing device 500 described below with respect to FIG. 6. While only a single user 110 and a single provider 170, and respective client computing devices 120, 180 are illustrated in FIG. 1, the present innovations may be implemented with one or more users and one or more providers.

Each of the servers 130, 140, 150 may be implemented as a single server computing device or as multiple server computing devices arranged in a distributed or clustered computing arrangement. Each such server computing device may be composed of hardware components like those of computing device 500 described below with respect to FIG. 6.

Each of the servers 130, 140, 150 includes one or more processors (e.g., CPUs), a network interface, and memory. The respective processor(s) is configured to execute computer instructions that are stored in one or more computer-readable media, for example, the memory of the respective server. Each server includes a network interface that is configured to allow the respective server to transmit and receive data in one or more networks, e.g., a network connecting the respective server, the user client 120 and the provider client 180. The network interface may include one or more network interface cards (NICs). The memory of each server stores its respective data and instructions.

The user client computing device 120 provides a sandbox 121 within which computer programs may be run. The sandbox 121 is any security container that limits the operations that are allowed to be performed by computer programs running within it. For example, a sandbox may be implemented using a virtual machine operating on the user client computing device 120 or a separate computing device executing an operating system separate from the user client computing device 120. Computer programs running within a sandbox are typically granted only those permissions that they are deemed to require. For example, a sandbox may, by default, prevent computer programs running within it from accessing any data other than their own and that explicitly provided to them via a system dialogue, e.g. a file picker. Similarly, a sandbox may limit network connectivity to only that required, e.g. only inbound connections.

A custom computer program 122 provided by the provider 170 is executed within the sandbox 121. The custom computer program 122 comprises executable code that can be run in the sandbox 121. When the sandbox 121 is provided by a web browser, the custom computer program 122 may be JavaScript and/or other executable code. When the sandbox 121 is for native applications, the custom computer program 122 may be any executable code runnable on the system, e.g. native binary code, script files, bytecode etc. The custom computer program 122 may include a graphical user interface (GUI) 114 that is displayed to the user 110 on the display 112. The graphical user interface 114 may be a web browser window, a client application window, an operating system window, an integrated development environment window, a virtual terminal window or other computer graphical user interface window. If the custom computer program wants an operation to be performed that it cannot perform itself, or otherwise cause to be performed, from within the sandbox 121, then it sends a request to the secure request forwarder 123.

In some embodiments, the custom computer program has been downloaded from the custom computer program server 130 which contains a custom computer program store 132. The custom computer program store stores one or more custom computer programs that are available to be downloaded and used. The custom computer program server 130 may limit which users can access given custom computer programs and/or their ability to read or modify custom computer programs.

Figure 2:
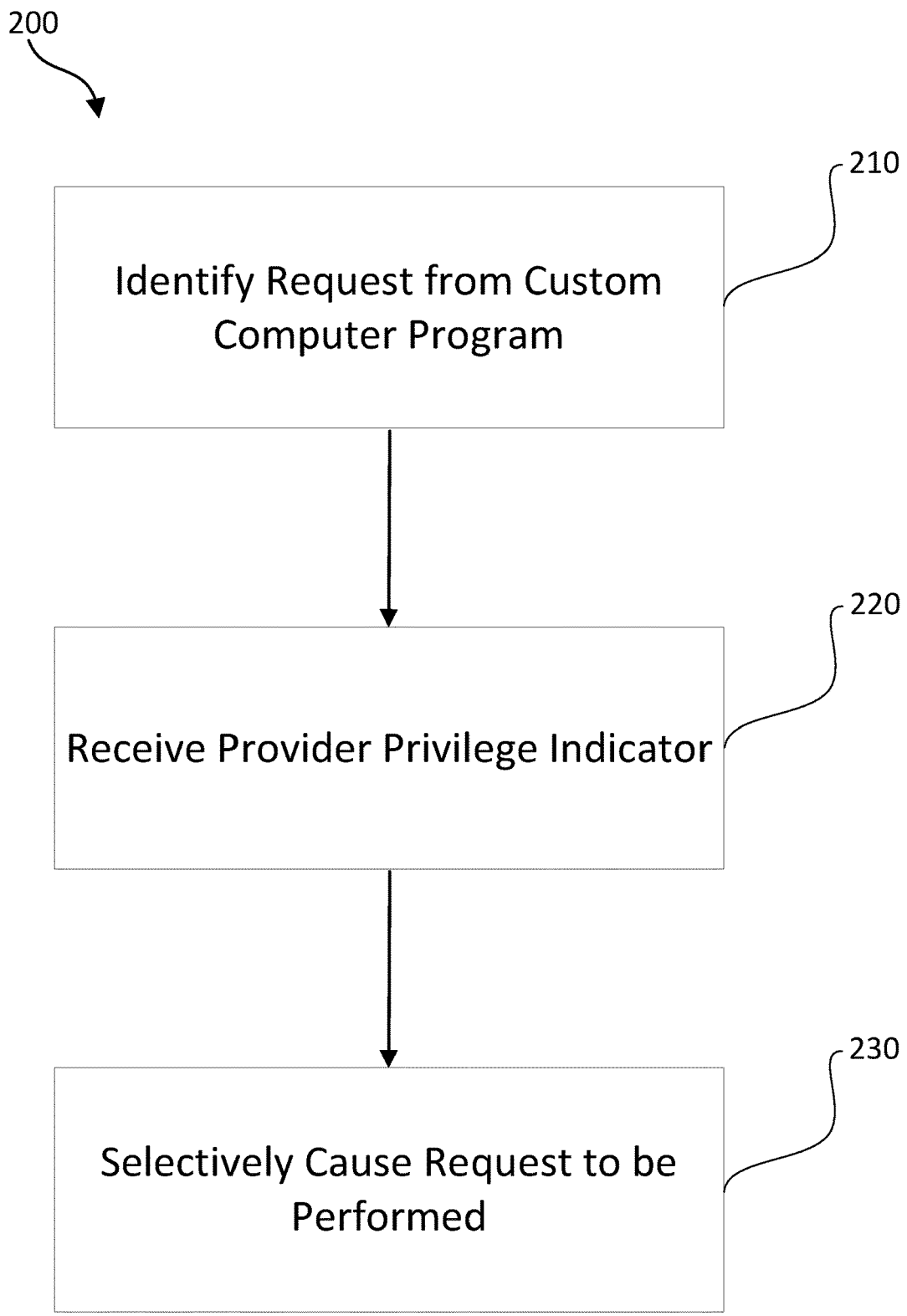
FIG. 2 is a flow diagram illustrating an example method for handling requests from a custom computer program, in accordance with example embodiments.
Figure 3:
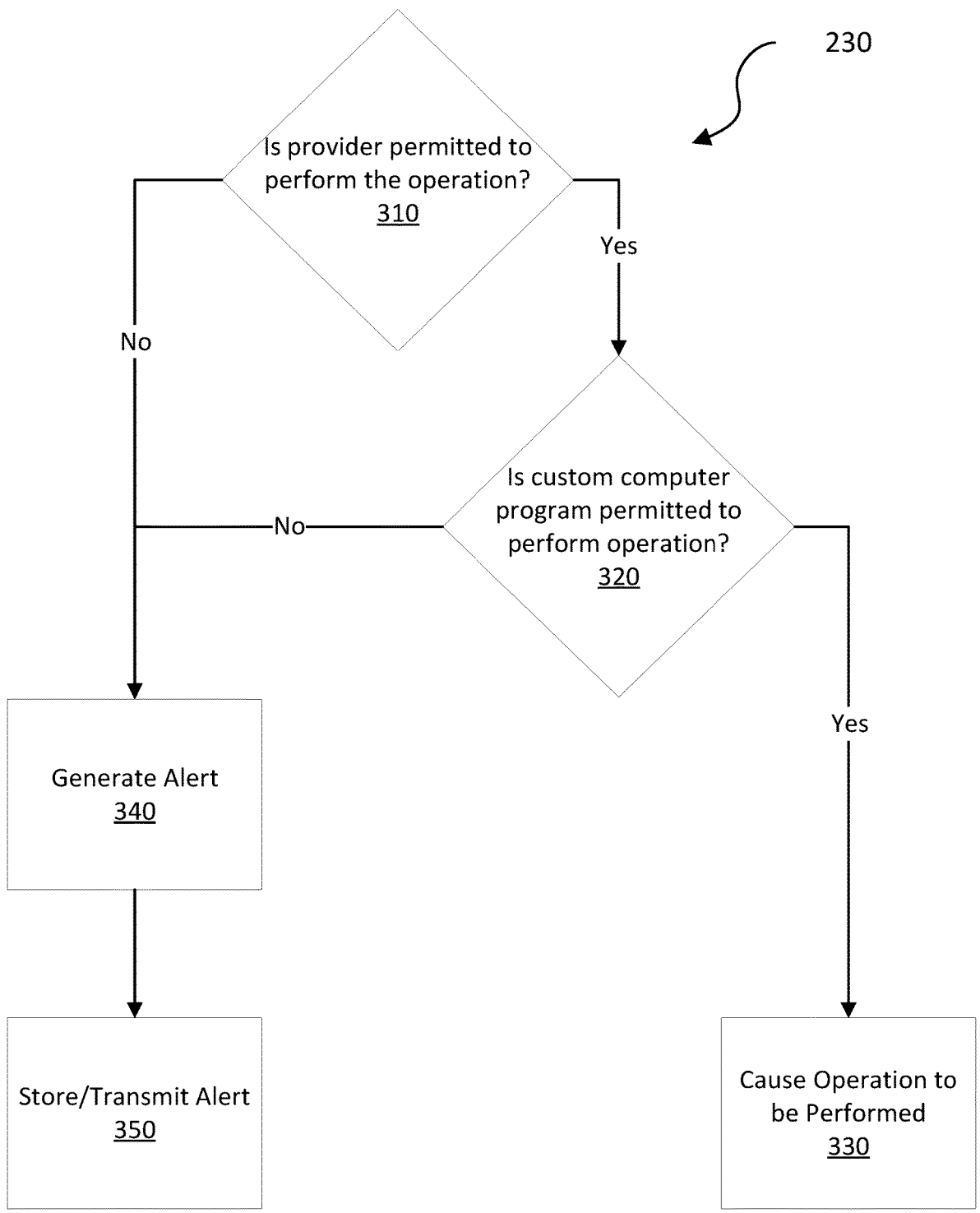
FIG. 3 is a flow diagram illustrating an example submethod by which a request from a custom computer program is selectively caused, in accordance with example embodiments.

In the example of FIG. 1, the secure request forwarder 123 is a computer program on the user client 120 configured to perform the method 200, which is described in relation to FIGS. 2 and 3. In order to do so, it uses a provider privilege indicator 124-1 detailing the security privileges of the provider 170 of the custom computer program 122. A custom computer program privilege indicator 124-2 may also be used. The custom computer program privilege indicator 124-2 details security privileges specified by the provider 170 for the custom computer program. Based on the result of mapping the provider privilege indicator 124-1 to custom computer program privilege indicator 124-2 (such as is discussed in the method 200 of FIG. 2), the secure request forwarder 123 may forward the request from the custom computer program 122 to the request performer 152 on the request server 150.

In some embodiments, a user security token 125 is included in the request sent to the request performer 152 by the secure request forwarder 123. The user security token 125 may be any datum usable for authenticating the permissions and/or identity of the user 110. Examples include a password, a password hash and a cryptographic key. If the user security token 125 is present on the user client 120 then the sandbox 121 at least prevents the custom computer program 122 from accessing the user security token 125.

In some embodiments, the privilege indicators 124-1, 124-2 are downloaded from a security indicator provider 142 hosted by the security server 140. To provide these indicators, the security indicator provider 142 may access an internal store specifying the security privileges assigned to each user and/or custom computer program. Alternatively, the security indicator provider 142 may access an external store, e.g. a database, containing data specifying these privileges.

In some embodiments, the user security token 125 is downloaded from the security token provider 144 hosted by the security server 140. To provide these tokens 125, the security indicator provider 144 may access an internal store specifying the security privileges assigned to the respective user. Alternatively, the security token provider 144 may access an external store, e.g. a database, containing data specifying these privileges. When the user security token 125 is a cryptographic key, the security token provider 144 may provide it by way of a multistep method. First, the user provides a username and hashed password to the security token provider 144. The security token provider 144 verifies that these are valid and returns a cryptographic key that can be used as a security token. Subsequently, the user 110 need not use their password to authenticate themselves and may instead use their key.

The request performer 152 is a computer program on the request server 150 that performs, or causes performance of, the operation requested in requests forwarded by the secure request forwarder 123 (those requests that the provider is authorized to perform on the customer computer program). Examples of operations that may be requested include providing and/or requesting data from other computing systems, such as retrieving data items 164 from the database 160, writing data items 164 to the database 160 and performing calculations.

In some embodiments, the request performer 152 authenticates that the user 110 is permitted to perform the requested operation by examining the user security token 125. The request performer 152 refuses the request if the user is not permitted to perform the requested operation.

The database 160 may include a database server module 162 for storing and retrieving database data including data items 164. The database 160 may be implemented as a single server computing device or as multiple server computing devices arranged in a distributed or clustered computing arrangement. Each such server computing device may be composed of hardware components like those of computing device 500 described below with respect to FIG. 6.

The database 160 may include one or more processors (e.g., CPUs), a network interface, and memory. The processor(s) may be configured to execute computer instructions that are stored in one or more computer-readable media, for example, the memory of the database 160. The database 160 may include a network interface that is configured to allow the database 160 to transmit and receive data in one or more networks, e.g., a network connecting the request server 150 and the database 160. The network interface may include one or more network interface cards (NICs). The memory of the database 160 may store data or instructions. The instructions stored in the memory may include the database server module 162.

The provider client computing device 180 enables the provider 170 to upload code 182 for the custom computer program 122 to the custom computer program store 132. The provider 170 can also specify custom computer program privilege settings 184 and upload them to the security indicator provider 142 using the provider client 180. The custom computer program privilege settings 184 specify the security privileges that the provider 170 believes their custom computer program requires to function.

In some embodiments, the provider client 180 downloads a provider security token 186 from the security token provider 144. The provider security token 186 may take any of the forms that the user security token 125 may take. It may be used to authenticate the provider client 180 with the custom computer program store 132 and the security indicator provider 142.

The functionality of the provider client 180 is typically provided using a graphical user interface (GUI) 174 that is displayed to the provider 170 on the display 172. The graphical user interface 174 may be a web browser window, a client application window, an operating system window, an integrated development environment window, a virtual terminal window or other computer graphical user interface window.

Request Handling Method

FIG. 2 is a flowchart illustrating an example method 200 by which requests from a custom computer program are securely handled. The method 200 is performed by computer-readable instructions, e.g. software, for execution by one or more processors of one or more computing devices (e.g., the computing device 500 of FIG. 4). In some embodiments, the one or more computing devices are the user client 120. In other embodiments, the one or more computing devices are all or some portion of the devices of computer system 100.

At step 210 of method 200, a request from a custom computer program is identified. The request corresponds to an operation that the custom computer program wants to be performed.

The request may comprise any form and/or mechanism that enables communicating from a custom computer program within a sandbox to a computer program outside the sandbox. For example, the request may be in the form of an API call that is permitted within the sandbox. Alternatively, the request may be data that a custom computer program writes to a file, where the file is created by or otherwise writable to by the custom computer program and is at least readable by computer programs outside the sandbox. Other forms that the request may take include, but are not limited to, a message posted to a message queue, a permitted network communication, and/or a permitted system call where 'permitted' refers to those variants that may be performed within the sandbox.

In embodiments where the custom computer program is a web application, the request may take the form of an HTML postMessage API call by the custom computer program on the object handling the request. This may queue a MessageEvent that is able to be read by the handling object. This mechanism allows a request to be communicated securely from a custom computer program within the sandbox to an object outside.

In some embodiments, identifying the request comprises recognizing the desired operation from the request. The desired operation may be recognized from the request by mapping from an identifier in the request to an operation. The identifier may be any of a text string, a numerical ID, markup language code or an object representation. The mapping from the identifier to the desired operation may be performed using hardcoded associations, an in-memory dictionary, a markup language listing of associations and/or one or more database entries.

In other embodiments, the request handler identifies that the request has been made without recognizing the desired operation.

In any of these embodiments, additional information may be recognized from the request such as a category of the desired operation, a security level of the desired operation and/or the custom computer program making the request.

In step 220, a provider privilege indicator is received. The provider privilege indicator is any code or data that is usable to determine whether the provider of the custom computer program is permitted to perform the operation to which the request corresponds. While step 220 is shown as following step 210 in the figure, in some embodiments, step 220 is performed prior to or concurrently with step 210.

In some embodiments, the provider privilege indicator is a data item that describes the operations that the custom computer program provider is permitted to perform. This data item may be an in-memory data item, e.g. an object. Alternatively, it may be one or more database entries, markup language data or a text file.

In other embodiments, the provider privilege indicator is code comprising a function that accepts as an input an operation identifier and returns a binary value indicating whether or not the provider is permitted to perform it. This code may have been developed by a human developer or may have been generated by a code generator.

In some embodiments, the provider privilege indicator is a Boolean value returned from a server. In this case, subsequent to completing step 210, a query comprising the operation identifier or some transformation of it is sent to the server. The server then returns true if the provider is permitted to perform the desired operation and false otherwise. The identity of the custom computer program provider may be included in the query or be otherwise known to the server.

In some embodiments a custom computer program privilege indicator is also received. The custom computer program privilege indicator is usable to determine whether the provider of the custom computer program has specified that the custom computer program should be permitted to perform the operation to which the request corresponds. The custom computer program privilege indicator may take any of the forms that the provider privilege indicator may take.

In step 230, the operation to which the request corresponds is selectively caused to be performed based on at least the provider privilege indicator. In some embodiments, the operation is caused to be performed if the provider privilege indicator indicates that the provider is permitted to perform the operation and is otherwise not caused to be performed. Details of a range of embodiments of this step are described in relation to FIG. 3.

Selective Causation Method

FIG. 3 is a flowchart illustrating an example implementation of step 230 of the preceding figure, as a submethod by which the requested operation is selectively caused to be performed. It should be understood that any of the steps indicated by this Figure may be omitted and may be performed in a different order to that indicated. In particular, steps 320, 340 and 350 may be omitted and the order of steps 310 and 320 may be reversed.

The submethod 230 begins at step 310. In step 310, it is determined whether the provider of the custom computer program is permitted to perform the operation based on the provider privilege indicator. This ensures that the privilege of the custom computer program never exceeds the privilege of the provider.

Where the provider privilege indicator is a data item describing the operations that the provider is permitted to perform, this determination may be made by inspecting the data item. In embodiments where the provider privilege indicator is code comprising a function that accepts as an input an operation identifier and returns a binary value, the determination is made by evaluating the function on the operation identifier. Where the provider privilege indicator is a Boolean value, this determination is made by reading the Boolean value. The operation is permitted if the value is true and is not permitted if the value is false.

If the provider is permitted to perform the operation, in step 320, it is determined whether the provider has specified that the custom computer program should be permitted to perform the operation. This determination is based on the custom computer program privilege indicator.

Where the custom computer program privilege indicator is a data item describing the operations that the provider has specified that the custom computer program should be permitted to perform, this determination may be made by inspecting the data item. In embodiments where the custom computer program privilege indicator is code including a function that accepts as an input an operation identifier and returns a binary value, the determination is made by evaluating the function on the operation identifier. Where the custom computer program privilege indicator privilege indicator is a Boolean value, this determination is made by reading the Boolean value. The operation is permitted if the value is true and is not permitted if the value is false.

If the custom computer program is permitted to perform the operation, in step 330, the operation is caused to be performed. The operation may be caused to be performed by any mechanism that results in the performance of the operation as a consequence of this step. For example, the operation may be caused to be performed by making an API call to a library usable to perform the operation. Alternatively, it may be caused to be performed by invoking a remote service, e.g. by way of a SOAP or REST call. In some embodiments, the operation may be caused to be performed by publishing a message to a message queue. The message is subsequently read by a subscriber to the message queue which performs the operation based on the message. In other embodiments, the operation is performed as part of the secure request handling method without any intermediaries.

Examples of operations that may be caused to be performed include retrieving data items from a database, writing data items to a database and performing calculations. The performed operation may return a response. This response may be returned by a similar mechanism by which the operation is caused to be performed, e.g. a response to a remote service call, a result from a function call and/or a message. In other embodiments, receiving this response may involve a further operation. For example, an operation to update some data is caused to be performed by way of a remote service call, and the updated data is then retrieved by way of another subsequent remote service call.

These responses may be desired by the custom computer program. This response may be communicated to the custom computer program by similar mechanisms to those that the custom computer program uses to communicate the request. For example, the response may be transmitted to the custom computer program by way of an API call. Alternatively, the response may be written to a file that is readable by the custom computer program. Other forms by which the response may be communicated to the custom computer program include, but are not limited to, a message posted to a message queue, a network communication accessible to the custom computer program, and/or a system call for relaying information to the sandboxed application.

In embodiments where the custom computer program is a web application, the response may be communicated by way of an HTML postMessage API call on the object that includes the custom computer program. This queues a MessageEvent that is able to be read by the custom computer program.

If the provider is not permitted to perform the operation and/or the custom computer program is not permitted to perform the operation, in step 340, an alert is generated. The generated alert is descriptive of the request to perform the operation. In some embodiments, the generated alert is a Boolean flag indicating that such a request has been made and is not permitted. In other embodiments, the generated alert is more descriptive and may contain details of the request such as the requested operation, the time of the request, the provider of the custom computer program and the user of the custom computer program.

In step 350, the generated alert is stored and/or transmitted. The generated alert may be stored persistently or temporarily. Examples of storing the alert persistently include: saving the alert as a new file; appending the alert to a log file; and adding one or more entries representing the alert to a database. Examples of storing the alert temporarily include: saving the alert to a cache; writing the alert to a temporary file; and adding an entry representing the alert to an in-memory data structure e.g. a list, an array or a dictionary.

The alert may be transmitted locally, e.g., within the same computing device, or to a remote computing device. Examples of transmitting the alert locally include making an API call, making a system call, using interprocess communication mechanisms provided by the operating system, and displaying the alert using a graphical user interface. Methods by which the alert may be transmitted to a remote computing device include: invoking a remote service, e.g. by way of a SOAP or REST call; publishing the alert to a message queue and sending a network communication.

Web Browser Embodiment

Figure 4:
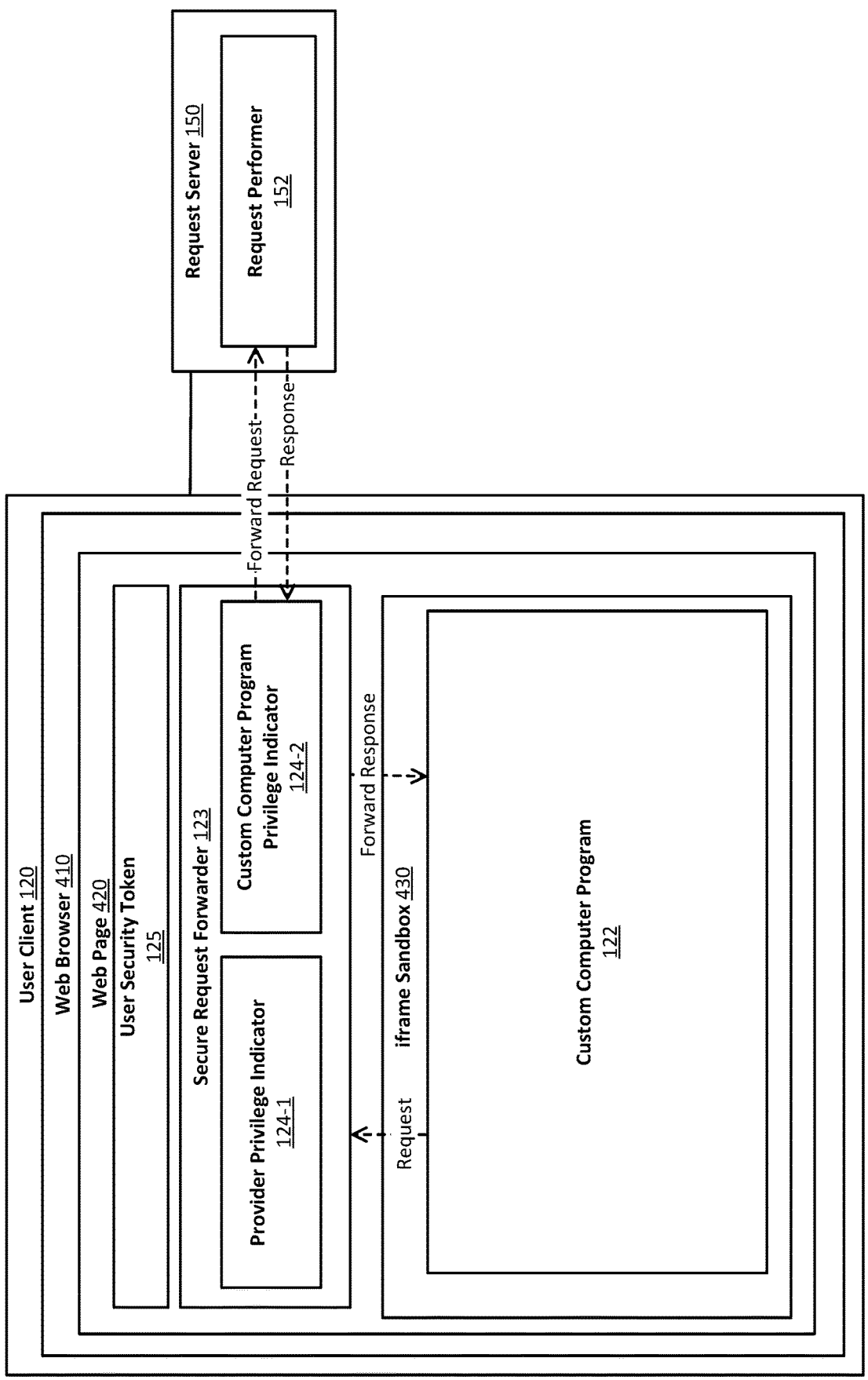
FIG. 4 is a block diagram illustrating an example of a computer system configured to secure a web application, in accordance with example embodiments.

FIG. 4 illustrates example embodiments of the user client 120 configured to secure a web application. While, for consistency and ease of explanation, this embodiment is described in the context of the system of FIG. 1, it should be noted that such a user client 120 may be deployed independently or in the context of another system.

These embodiments of the user client 120 include a web browser 410. The web browser 410 may be any web browser that is capable of sandboxing web content and configuring such a sandbox using an HTML iframe sandbox attribute. Examples of such web browsers include Google Chrome™, Mozilla Firefox®, Safari® and Microsoft Edge®.

A web page 420 is loaded within the web browser 410. In addition to the markup language of the web page, the web page 420 includes any executable code, e.g. JavaScript, and object data referenced by the markup language. It may also include objects, code and data retrieved using the executable code. The web page 420 has been downloaded from a server or loaded from a location on the user client 120.

In some embodiments, the custom computer program 122 is loaded within an iframe sandbox 430. The iframe sandbox is a sandbox provided by a web browser and configured by an HTML iframe sandbox attribute. As with other sandbox implementations, the iframe sandbox 430 limits the data that computer programs within the sandbox has access to and/or the operations it is able to perform. iframe sandboxes typically limit the extent to which code executed within the sandbox can access data and/or code in the remainder of the webpage. For example, the iframe sandbox 430 may prevent the custom computer program accessing the user security token 125 and/or malignly affecting the operation of the secure request forwarder 123. Other sandboxes may be used also in web browser embodiments.

In these embodiments, the request may take the form of an HTML postMessage API call by the custom computer program 122 on the object corresponding to the secure request forwarder 123. This queues a MessageEvent that is able to be read by the secure request forwarder. In this way, the request is communicated securely from the custom computer program 122 contained in the iframe sandbox 430 to the secure request forwarder 123.

The secure request forwarder 123 selectively causes the operation to be performed according to the steps of method 200. Causing the operation to be performed may take any of the forms described in relation to method 200, e.g. invoking a remote service by way of a REST call.

If the performed operation returns a response to the secure request forwarder 123, this response may be forwarded to the custom computer program by way of an HTML postMessage API call on the iframe object corresponding to the iframe sandbox 430. This queues a MessageEvent that is able to be read by the custom computer program 122.

The remaining components of the system and the functions they perform may take any suitable form described in relation to FIG. 1 of this specification.

Native Application Embodiment

Figure 5:
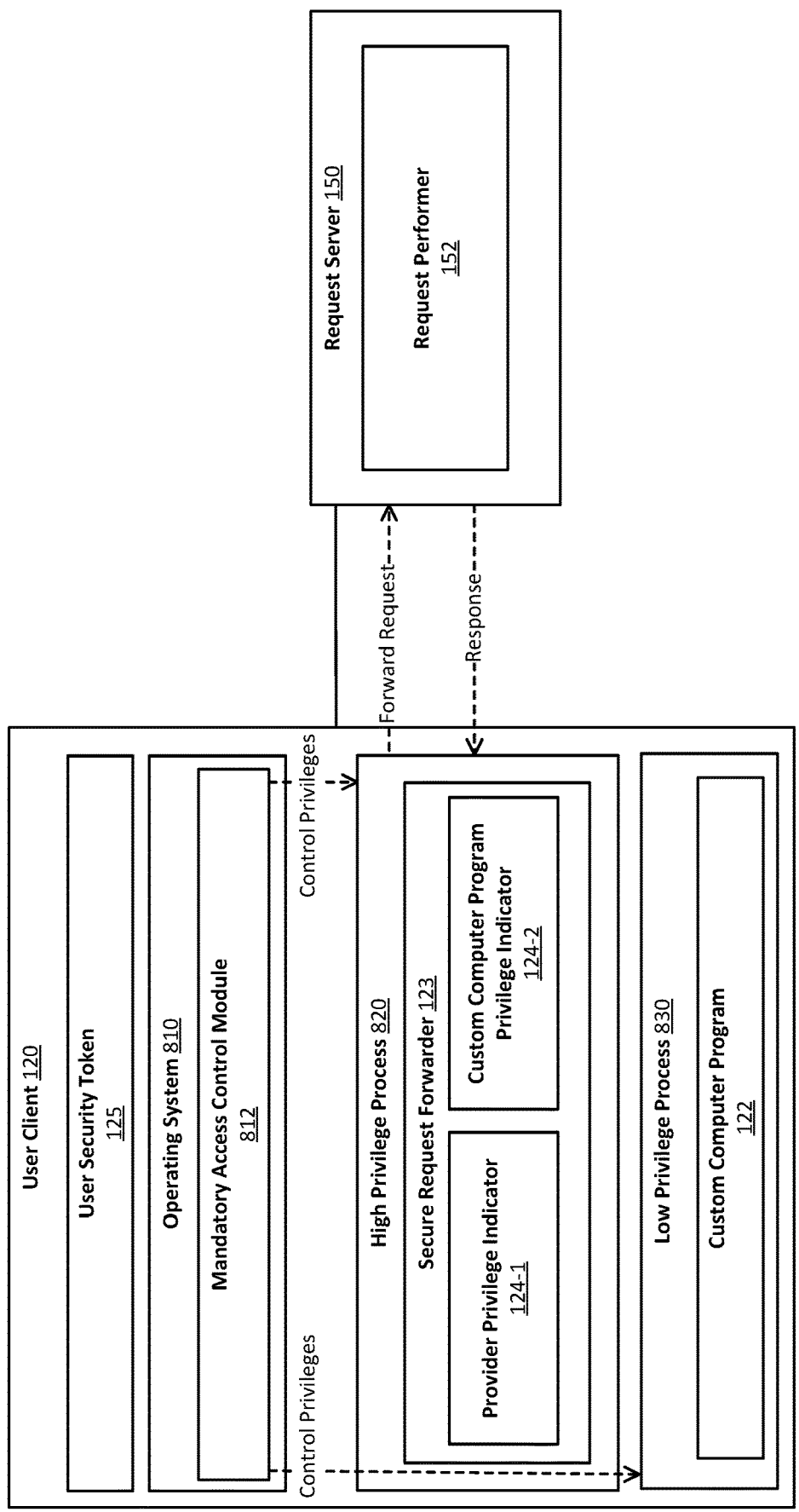
FIG. 5 is a block diagram illustrating an example of a computer system configured to secure a native application, in accordance with example embodiments.

FIG. 5 illustrates an example embodiment of the user client 120 configured to secure a native application. While, for consistency and ease of explanation, this embodiment is described in the context of the system of FIG. 1, it should be noted that such a user client 120 may be deployed independently or in the context of another system.

It is important to highlight that the term 'process' as used below refers to a computer process, as is common nomenclature in the art, rather than its plain meaning. A process includes executable machine code that is associated with a program. Memory is assigned to the process. The assigned memory typically is allocated as virtual memory. Virtual memory is an abstraction that presents a, typically distinct, contiguous address space to each process which is mapped on to a portion of main memory and/or other computer storage. By presenting virtual memory rather than physical memory to a process, a process is prohibited from writing to the portions of main memory assigned to other processes except through prescribed mechanisms. Many processors and operating systems provide hardware and software support, respectively, for at least several of the above features of a process.

These embodiments of the user client 120 include an operating system 810. This operating system may be any suitable operating system for the user client 120, e.g. Windows®, macOS®, iOS®, Android™ and variants of Linux. The operating system contains a mandatory access control (MAC) module 812 that allows the privileges of processes to be finely controlled. Examples of MAC modules include: AppArmor and SELinux for Linux; Mandatory Integrity Control for Windows; and the TrustedBSD MAC framework used in iOS and macOS. These fine-grained controls enable processes to be used as sandboxes, as the MAC module 812 can limit the file, network and system resource access that the process has.

In these embodiments, the secure request forwarder 123 is in a process 820 that the MAC module 812 has granted "higher" privileges to, e.g., the process is at least able to communicate with the request server 150 and access the user security token 125. In some embodiments, few if any limits are applied to this process 820 besides those applied to a standard user process. In other embodiments, this process 820 is tightly controlled and may merely be given the privileges required to do its job, e.g. receiving requests, accessing the user security token 125 and forwarding requests to the request performer 152.

The secure request forwarder 123 selectively causes the operation to be performed according to the steps of method 200. Causing the operation to be performed may take any of the forms described in relation to method 200, e.g. invoking a remote service by way of a REST call.

The custom computer program is contained in a process 830. In the example of FIG. 5, the MAC module 812 has granted "lower" privileges to this process, e.g., the process is at least prohibited from accessing the user security token 125 and malignly affecting the secure request forwarder 123. In some embodiments, this process is only given minimal privileges. In other embodiments, the process is specifically restricted from affecting the high privilege process 820 and accessing the security token 125 but otherwise has substantially normal privileges.

Communication between the high privilege process and the low privilege process is typically by way of operating system provided interprocess communication mechanisms. However, any other appropriate method described in relation to system 100 and method 200 may also be used.

The remaining components of the system and the functions they performs may take any suitable form described in relation to FIG. 1 of this specification.

Example Computing Device

Figure 6:
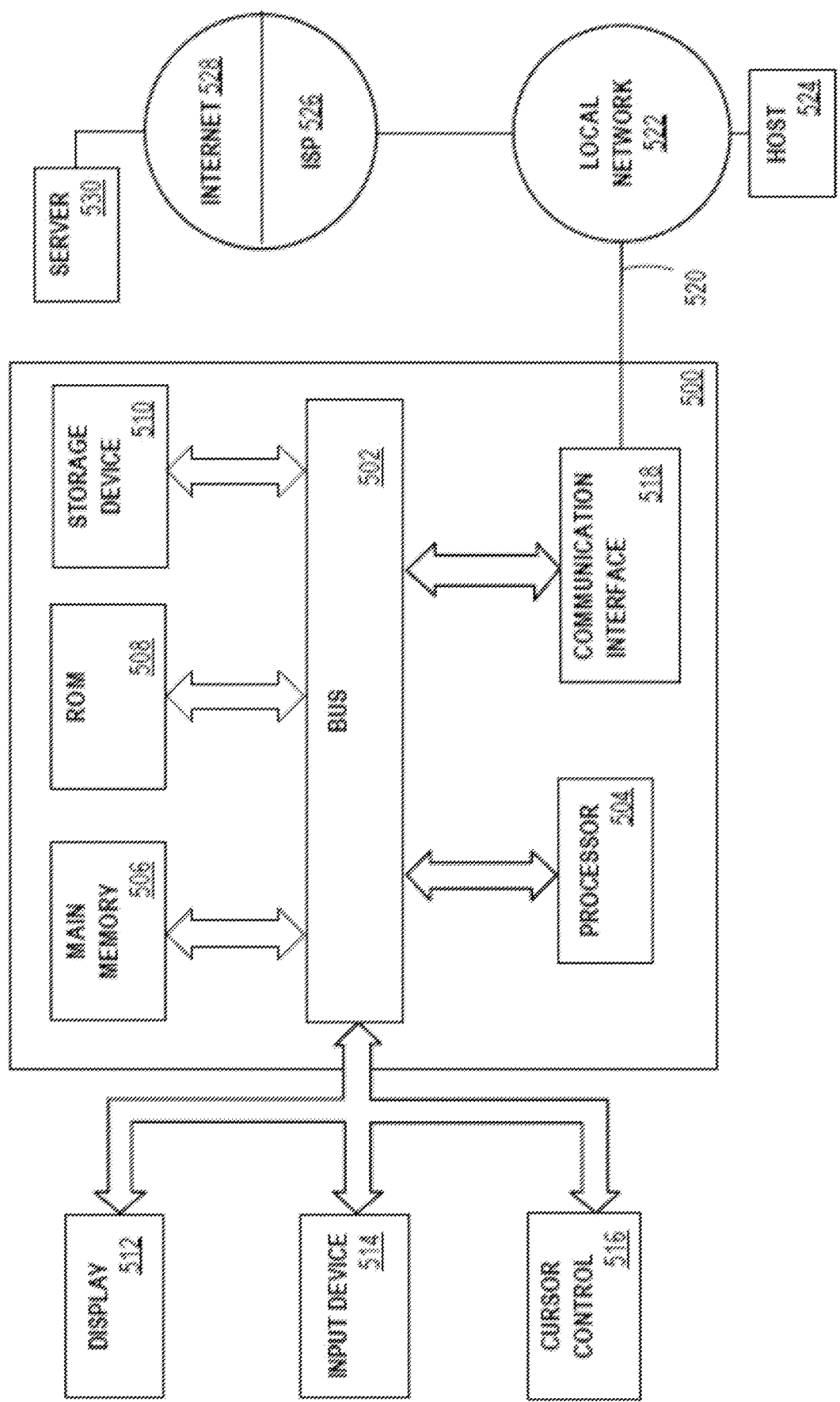
FIG. 6 is a schematic diagram of a computing device in which software-implemented processes of the example embodiments may be embodied.

Referring now to FIG. 6, it is a block diagram that illustrates a computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described computer hardware is presented for purpose of illustrating certain underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Example Processor

Figure 7:
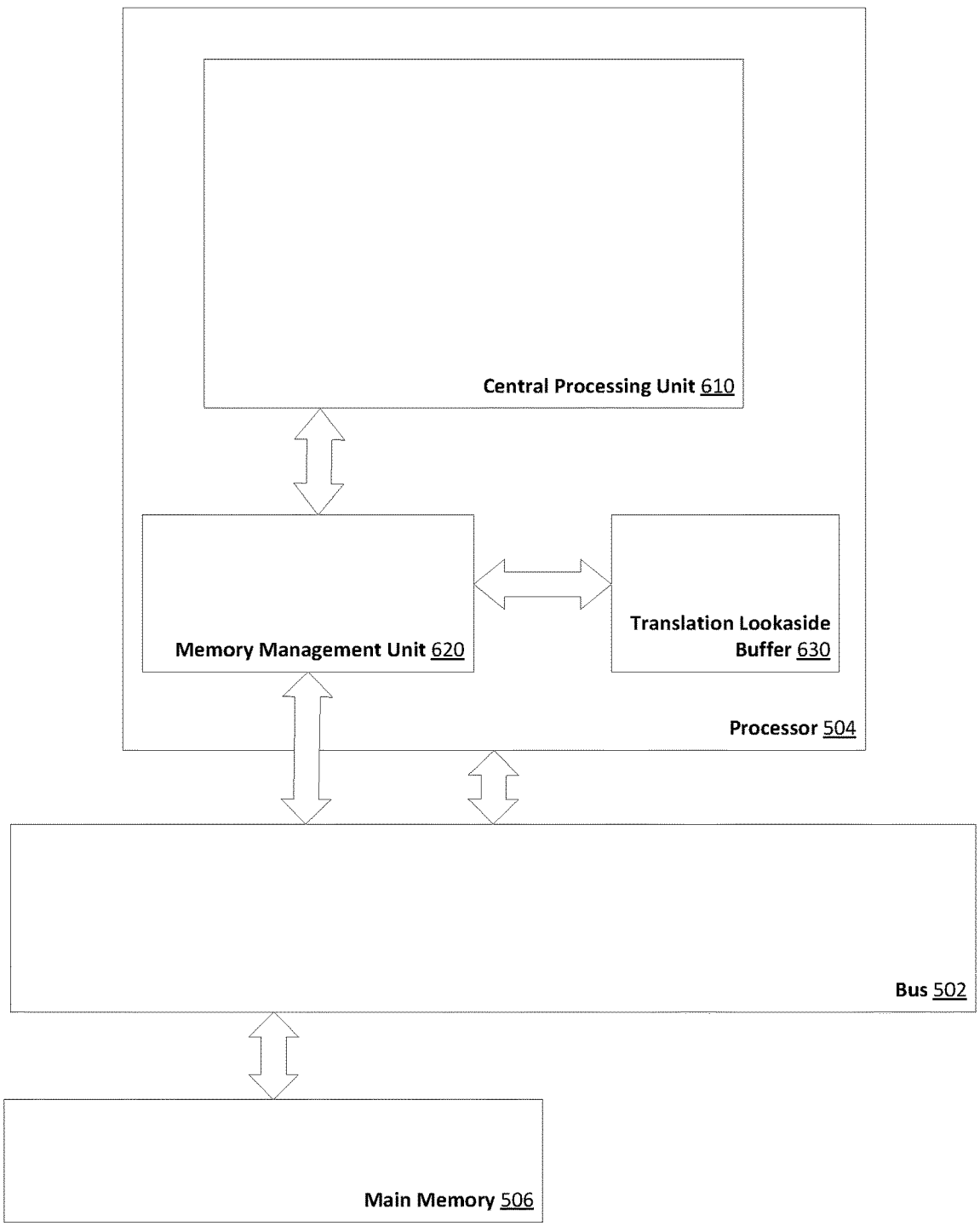
FIG. 7 is a schematic diagram of components of an example processor suited to perform the methods of the example embodiments.

Referring now to FIG. 7, it is a block diagram that illustrates an example embodiment of the processor 504 upon which methods performing the subject innovations may be executed. Processor 504 and its components, including their connections, relationships, and functions, is meant to be exemplary only, and not meant to limit implementations of the subject innovations. Other processors suitable for performing the relevant methods may have different components, including components with different connections, relationships, and functions.

In the embodiment of FIG. 7, The central processing unit (CPU) 610 is the part of the processor that is responsible for the execution of code instructions and controlling the other modules of the processor 504. The CPU may also perform a wide array of other functions, such as interacting through the bus 502 with the other components of the computer system 500.

The memory management unit (MMU) 620 is responsible for managing interactions between the CPU 610 and the main memory 506. The instructions of a computer process running on CPU 610 will contain references to virtual memory addresses rather than the physical address in main memory 506 where the process data is stored. The MMU 620 translates between these virtual addresses and the physical address in main memory needed to actually access the data.

Virtual addresses are used for several reasons. First, a computer process is unlikely to know in advance where it will be stored in main memory 506. The use of virtual addresses allows the process to be stored anywhere in main memory 506. The memory assigned to a process is presented to it as a contiguous range known as a virtual address space. However, the physical addresses to which this virtual address space is assigned need not be contiguous. This allows it to use gaps between other processes in main memory. These sections may have previously been assigned to now closed processes.

The use of virtual addresses also allows the MMU 620 to provide memory protection. Memory protection refers to only allowing a process to access the section of physical memory assigned to its virtual address space. Using virtual addresses allows the MMU 620 to ensure that virtual addresses are translated into physical addresses that the process is allowed to access or, if an address outside the virtual address space is attempted to be accessed, return an error. This prevents processes from interfering with one other.

In some embodiments, to provide this functionality, a mapping between virtual addresses and physical memory address is kept. This mapping is known as a page table as it is a mapping between small sections, known as pages, of physical and virtual memory. The page table could be kept in main memory 506. However, this would mean that two main memory 506 accesses would be needed for every virtual address access performed. The MMU 620 would need to first access main memory to receive the relevant part of the page table. The correct physical address for the requested virtual address is then determined by the MMU 620. The memory access is then performed using the physical address. Requiring two main memory 506 accesses has a significant performance impact as accessing main memory is much slower than performing operations on the processor 504.

To minimize the number of memory accesses required, a component known as a translation lookaside buffer (TLB) 630 may be provided. The translation lookaside buffer (TLB) 630 is a small, fast cache for storing page table entries. The TLB is typically implemented as a content addressable memory but may be implemented using any suitably fast memory.

While the TLB 630 is typically not large enough to store all of the page table, or even the entire page table for a given process, it can store the parts of the page table that the MMU 620 expects to be used imminently. Various algorithms, with both hardware and software implementations, may be implemented to optimize which part of the page table is stored in the TLB 630.

The mappings stored in the TLB 630 are used to translate from physical to virtual addresses without an additional main memory access. When the MMU 620 attempts to access a virtual address whose mapping is not present in the TLB 630, the MMU 620 loads the relevant mapping from main memory 506. The relevant mapping is used by the MMU and/or stored in the TLB 630 for future use.

Memory Use by the System

Figure 8:
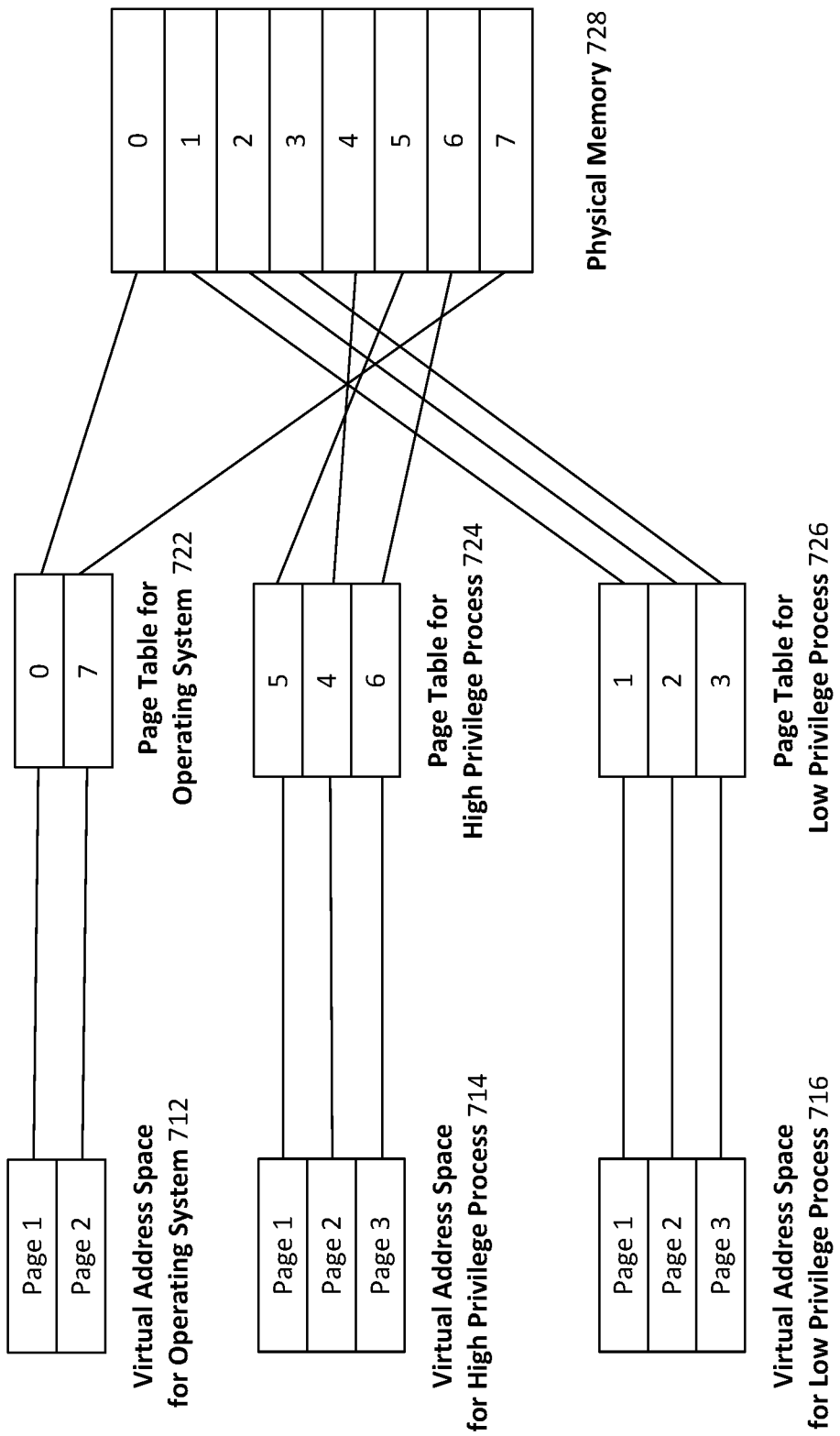
FIG. 8 is a schematic diagram demonstrating how certain processes may be represented in both physical and virtual memory, in accordance with example embodiments.

Referring now to FIG. 8, it is a diagram that illustrates an example embodiment of the state of physical and virtual memory in a user client 120 within a system 100 for securing a custom computer program. Alternatively or additionally, it could be considered to represent the state of virtual and physical memory when a request handling method 200 relating to the subject innovations is being executed by a processor 504 of a computing device 500.

Three virtual address spaces are shown: a virtual address space 712 used by the operating system 810; a virtual address space 714 for a high privilege process 820 containing a secure request forwarder 123; a virtual address space 716 for a low privilege process 830 containing a custom computer program 122; and.

These virtual address spaces 712, 714, 716 are mapped to locations in physical memory 728 by respective page tables 722, 724, 726. The page tables 722-726 indicate the page of the physical memory to which each page of virtual memory maps. The arrows from the virtual address spaces 712-716 to the page tables 722-726 illustrate from which page of the respective virtual address space the respective page table is mapping. Similarly, the arrows from the page tables 722-726 to physical memory 728 illustrate to which pages of physical memory they are being mapped. It should be noted that the page tables may be stored in either or both of main memory 506 and the TLB 630.

Typically, each process can only affect and access memory associated with its own virtual address space. As the low privilege process 830 cannot access or affect the memory of the operating system 810 or the high privilege process 820, the extent to which malicious code in the custom computer program 122 can affect their operation is limited.

Hardware configured to provide virtual address spaces for processes, such the MMU 620 and the TLB, is available in most processors. Similarly, most operating systems manage security privileges at a per process level, e.g. using mandatory and discretionary access control. Using this existing hardware and software is both likely to better secure against malicious code in the custom computer program and to do so using fewer computation resources.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A method performed by one or more processors, the method comprising:
    downloading a custom computer program from a custom computer program store, wherein a developer of the custom computer program comprises a human;
    initiating, by a user, execution of the downloaded custom computer program including a plurality of operations within a sandbox, wherein the sandbox is configured to limit operations performed by computer programs;
    initiating execution of a first operation of the custom computer program within the sandbox;
    in response to the sandbox not permitting execution of the first operation within the sandbox, transmitting by the customer computer program, to a secure request forwarder, a request to perform the first operation, wherein the secure request forwarder is configured to:
        identify, based on the request, the developer of the custom computer program;
        identify a first security privilege associated the developer of the custom computer program;
        determine, based on the request, an identifier of the custom computer program;
        identify a second security privilege associated with the identifier of the custom computer program;
        determine if the first security privilege and the second security privilege both indicate that the custom computer program is permitted to perform the first operation; and
        in response to determining that the first security privilege and the second security privilege both indicate that the custom computer program is permitted to perform the first operation, causing the first operation to be performed outside of the sandbox, such that even though the first operation is not permitted within the sandbox, the secure request forwarder initiates execution of the first operation outside of the sandbox; or
        in response to the determination that one or more of the first security privilege and the second security privilege indicate that the custom computer program is not permitted to perform the first operation, not causing the first operation to be performed regardless of a privilege level of the user.

2. The method of claim 1, wherein the sandbox is an iframe sandbox.

3. The method of claim 1, wherein said initiating execution of the custom computer program is responsive to a request from a user.

4. The method of claim 3, further comprising:
in response to the first security privilege indicating that the developer is not permitted to perform the first operation, generating an alert based on the request from the custom computer program and causing the alert to be at least one of stored or transmitted.

5. The method of claim 3, further comprising:
in response to the second security privilege indicating the custom computer program is not permitted to perform the first operation, generating an alert based on the request from the custom computer program and causing the alert to be at least one of stored or transmitted.

6. The method of claim 1, wherein the custom computer program comprises code executable by a web browser.

7. The method of claim 6, wherein the sandbox is provided by the web browser.

8. The method of claim 1, wherein the sandbox is implemented using mandatory access control.

9. The method of claim 1, wherein the first operation comprises retrieving data, the method further comprising: communicating a response comprising at least a portion of the retrieved data to the custom computer program.

10. A computing system comprising: a hardware computer processor; a non-transitory computer readable medium having software instructions stored thereon, the software instructions executable by the hardware computer processor to cause the computing system to perform operations comprising:
downloading a custom computer program from a custom computer program store, wherein a developer of the custom computer program comprises a human;
initiating, by a user, execution of the downloaded custom computer program including a plurality of operations within a sandbox, wherein the sandbox is configured to limit operations performed by computer programs;
initiating execution of a first operation of the custom computer program within the sandbox;
in response to the sandbox not permitting execution of the first operation within the sandbox, transmitting by the customer computer program, to a secure request forwarder, a request to perform the first operation, wherein the secure request forwarder is configured to:
identify, based on the request, the developer of the custom computer program;
identify a first security privilege associated the developer of the custom computer program;
determine, based on the request, an identifier of the custom computer program;
identify a second security privilege associated with the identifier of the custom computer program;
determine if the first security privilege and the second security privilege both indicate that the custom computer program is permitted to perform the first operation; and
in response to determining that the first security privilege and the second security privilege both indicate that the custom computer program is permitted to perform the first operation, causing the first operation to be performed outside of the sandbox, such that even though the first operation is not permitted within the sandbox, the secure request forwarder initiates execution of the first operation outside of the sandbox; or
in response to the determination that one or more of the first security privilege and the second security privilege indicate that the custom computer program is not permitted to perform the first operation, not causing the first operation to be performed regardless of a privilege level of the user.

11. A non-transitory computer readable medium having software instructions stored thereon, the software instructions executable by a hardware computer processor to cause a computing system to perform operations comprising:
downloading a custom computer program from a custom computer program store, wherein a developer of the custom computer program comprises a human;
initiating, by a user, execution of the downloaded custom computer program including a plurality of operations within a sandbox, wherein the sandbox is configured to limit operations performed by computer programs;
initiating execution of a first operation of the custom computer program within the sandbox;
in response to the sandbox not permitting execution of the first operation within the sandbox, transmitting by the customer computer program, to a secure request forwarder, a request to perform the first operation, wherein the secure request forwarder is configured to:
identify, based on the request, the developer of the custom computer program;
identify a first security privilege associated the developer of the custom computer program;
determine, based on the request, an identifier of the custom computer program;
identify a second security privilege associated with the identifier of the custom computer program;
determine if the first security privilege and the second security privilege both indicate that the custom computer program is permitted to perform the first operation; and
in response to determining that the first security privilege and the second security privilege both indicate that the custom computer program is permitted to perform the first operation, causing the first operation to be performed outside of the sandbox, such that even though the first operation is not permitted within the sandbox, the secure request forwarder initiates execution of the first operation outside of the sandbox; or
in response to the determination that one or more of the first security privilege and the second security privilege indicate that the custom computer program is not permitted to perform the first operation, not causing the first operation to be performed regardless of a privilege level of the user.

* * * * *